United States Patent [19]

Orlandi

[11] Patent Number: 5,082,241

[45] Date of Patent: Jan. 21, 1992

[54] ANTINOISE BAFFLE FOR SCREW TYPE VALVES WITH CERAMIC DISK SEALS

[75] Inventor: Alessio Orlandi, Castiglione d/Stiviere, Italy

[73] Assignee: Galatron S.r.l., Castiglione d/Stiviere, Italy

[21] Appl. No.: 689,967

[22] Filed: Apr. 23, 1991

[30] Foreign Application Priority Data

Apr. 24, 1990 [IT] Italy ................ 6976/90[U]

[51] Int. Cl.⁵ .................... F16K 47/02; F16K 3/08
[52] U.S. Cl. ................... 251/127; 137/625.4; 137/550
[58] Field of Search ............ 139/625.4; 251/127; 137/550, 454.5

[56] References Cited

U.S. PATENT DOCUMENTS 4,157,099  6/1979  Delker et al. ............... 251/127 X
4,621,659  11/1986  Pawelzik ................. 137/625.4 X
4,657,045  4/1987  Kitamura ................. 137/625.4

Primary Examiner—Arnold Rosenthal
Attorney, Agent, or Firm—McGlew & Tuttle

[57] ABSTRACT

The invention relates to an antinoise baffle especially for screw type valves having a first ceramic disk (13) fixed in the body with at least one hole (13a) for the flow of water, a second ceramic disk (14) resting against and rotating on the first with at least one lateral slot (14a) positionable in correspondence to and away from the one of the first disk following a quarter or half rotation of the second disk. At least one net (21) is placed and blocked of the second disk (14) and has at least one wing which extends towards the first disk near to one or each lateral slot (14a) or said second disk, the wings extending between said slot and the opening (20) for the outlet of water.

4 Claims, 2 Drawing Sheets

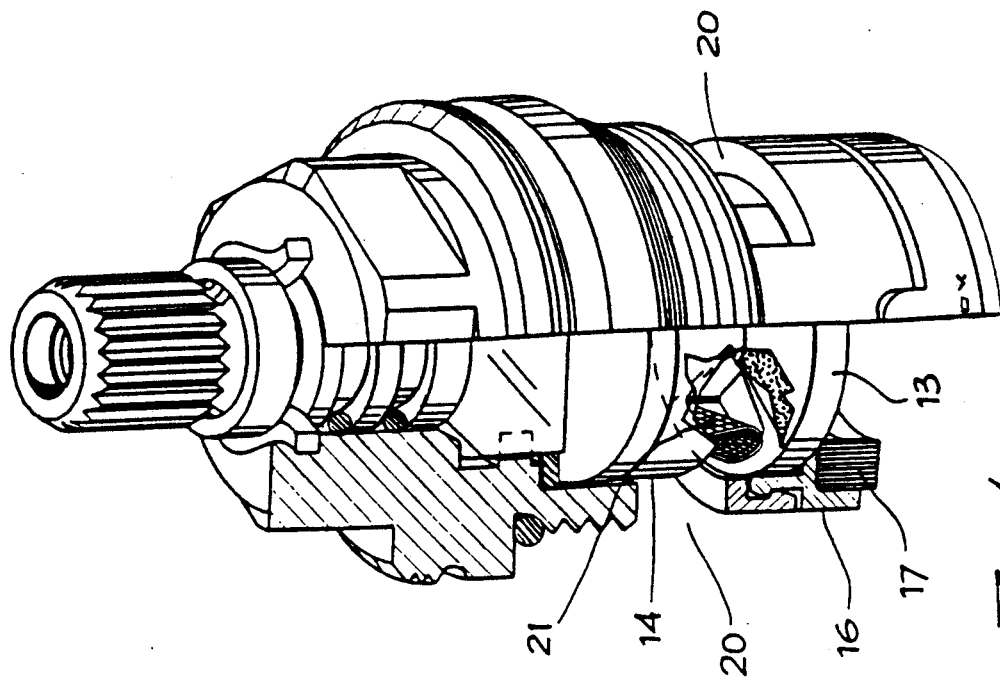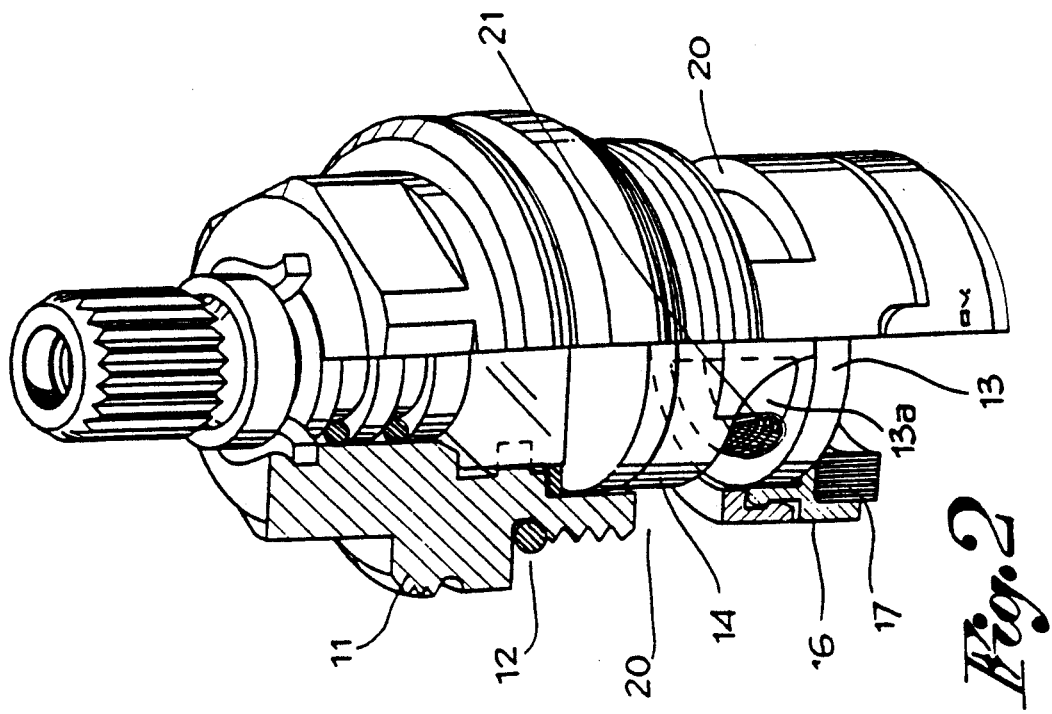

ANTINOISE BAFFLE FOR SCREW TYPE VALVES WITH CERAMIC DISK SEALS

The present invention generally relates to screw type valves with ceramic disk seals for the delivery of hot or cold water from a tap for sanitary systems, and more in particular to an antinoise baffle for said valves.

In certain realizations said valves comprise and annular head gasket, a fixed ceramic disk with at least one water inlet hole, a movable ceramic disk that rests against and rotates on the fixed one with at least one hole or slot which is positionable in correspondence to or away from the one of the fixed disk when the movable disk is rotated a quarter or a half turn. The gasket and disks are placed inside a hollow cylinder body designed to be screwed inside a tap in line with a water pipeline. The rotation of the movable disk is obtained through the use of a rotating control rod splined to the movable disk through the use of an entrainer, where at least the cylinder body has radial openings to let out the water, coming from the hole or slot of the movable disk, towards the outlet hole.

It is however known that the flow of water through valvular parts of such a valve always causes turbulence and noise, at times louder than the limits which are considered to be acceptable. It is thus necessary to eliminate or at least reduce the noise of said valves, something which has been tried in different ways, but without completely satisfactory results.

A method for reducing turbulence and noise has infact already been proposed. This method required that peduncies or barriers in the form of a net clot be placed in the valvular parts where the water flows, but both have the problem of notably obstructing the passage and thus reducing the flow capacity of the valve. Furthermore, the use of these elements is often difficult and requires the use of adhesives or additional fasteners which tend to complicate the valve structure.

The object of the present invention is to propose an antinoise baffle which can be fitted in said screw type valves without reducing their flow capacity and with a surprising result in reducing turbulence, cavitations and noise of the flow of water.

A second object of the invention is to propose a net type noise baffle which can be used with parts which are already in the valve, eliminating the need for adhesives or added fasteners and therefore not having to alter the structure of the components of the valve or the movements of the ceramic disks.

A further object of the invention is to propose a noise baffle which can be fitted to the valves with an opening/closing rotation of both a quarter and a half turn which, due to the configuration of the baffle, is able to guarantee a delivery of water even when there is dirt around the baffle. Said objects are possible with an antinoise baffle substantially in accordance with claim 1.

Examples of practical realizations of the invention will be better described below with references being made to the attached drawings in which:

FIG. 1 is a section of a screw type valve with an opening/closing rotation of a quarter turn;

FIG. 2 is a section of a screw type valve with an opening/closing rotation of a half turn;

Figure 3:
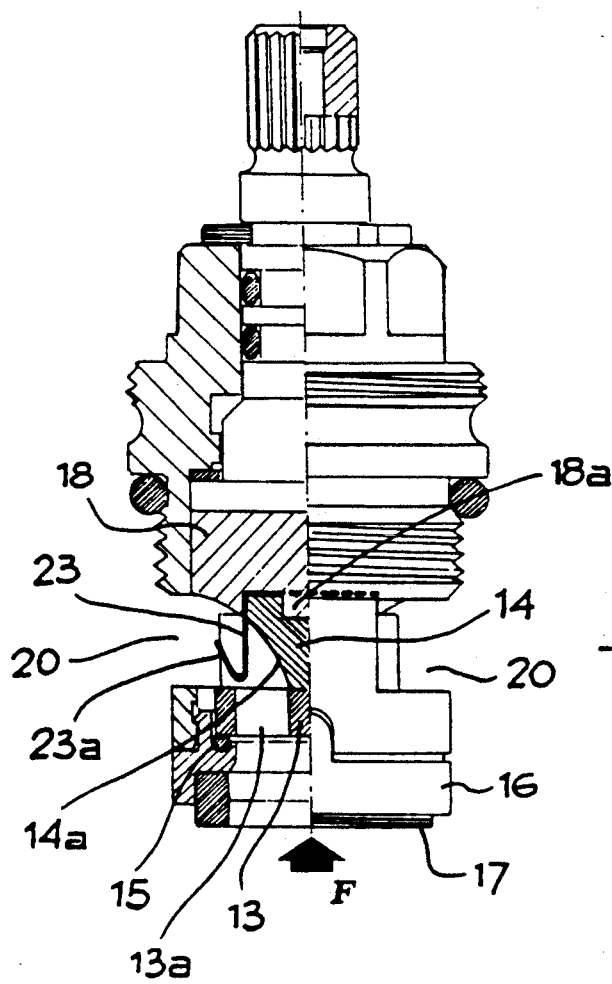
FIG. 3 is a partial axial section of a valve with an anti-noise baffle.

The valves shown comprise a hollow cylinder body (11) designed to be screwed into a tap (not shown) with the interpositioning of a seal (12), the tap being in line with a water delivery conduit, in the direction of the arrow (F) (FIG. 3). Valvular parts made up of two overlapping ceramic disks (13, 14), one below the other, are fitted in the cylinder body (11).

The lower disk (13) is fixed inside the body (11) and is positioned, if necessary through the use of a seal (15), on an axially movable ring (16) which has a bottom seal (17). Said disk (13) has at least one hole (13a) for the flow of water coming from the water conduit in the direction of the arrow (F).

The upper disk (14) rests against and rotates on the lower fixed disk (13) and has at least one hole or slot (14a) positionable in correspondence to and away from the hole (13a) of the fixed disk.

In the case of valves with a 90° opening/closing rotation, the fixed disk and the movable disk respectively have two holes (13a) and two slots (14a), whilst in the case of valves with a 180° rotation, the fixed disk and the movable disk respectively have one hole (13a) and one slot (14a).

In both cases, the movable disk (14) is splined to an entrainer (18) which is in turn splined to a control rod (19) rotated in the body, operated by a knob (not shown) and has rotation limit stops at 90° and 180°.

So as to spline the entrainer (18) to the upper disk (14), the entrainer (18) has a central bottom tab (18a) which is inserted in a slot (14b) formed on the upper surface of said disk (14).

The entrainer (18) and/or the cylinder body (11) have lateral openings (20) at the same height of slots (14a) of the movable disk (14) and are designed for the outlet of water from the valve.

Figure 4:
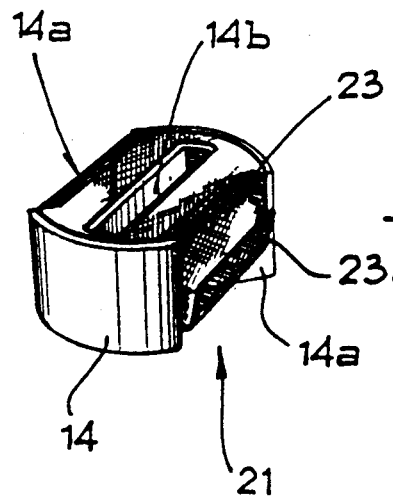
FIG. 4 is the antinoise baffle on top of a movable disk for the type of valve in FIG. 1.
Figure 5:
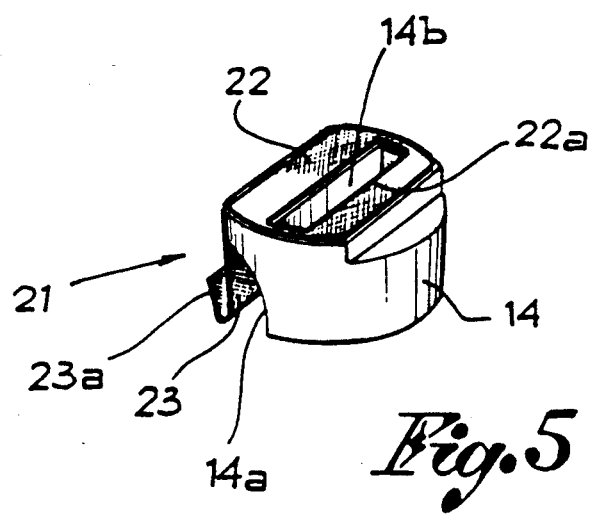
FIG. 5 is the antinoise baffle on top of a movable disk for the type of valve in FIG. 2.

In accordance with the invention, both types of valves also have an antinoise baffle (21) made of a metal netting. Said baffle (21) has a transversal horizontal part (22) designed to rest against the upper surface of the movable disk (14) and to be placed between said disk and the entrainer (18). Said part (22) of the net type baffle (21) also has a central slot (22a) which is in correspondence to the upper slot (14b) of the disk (14) and into which the splining tab (18a) of the entrainer (18) is fitted to keep the baffle in place (FIG. 3).

Where the movable disk (14) has one or two lateral slots (14a) (FIGS. 4 and 5), the net type baffle has one or two wings (23) which extend downwards from the horizontal part (22) and each end with a lower flap (23a) turned upwards towards the outside.

When the antinoise baffle (21) is fitted as in FIG. 3, it is blocked between the upper disk (14) and the entrainer (18) and one or each of its wings (23) orthogonally extend towards the fixed disk near to the slot or slots (14a) of movable disk (14). The wings extending between these slots and the opening (20) for the outlet of water from the body (11).

The wings (23) are such a length so as not to reach the lower disk (13) but to remain slightly raised from it; the flap (23a) strengthens the wings so as to prevent them from bending and also improves the validity of the baffle (21).

In practise this baffle does not reduce the valve flow capacity and allows for the water to flow even when dirt particles are trapped by the net. The net dampens water flow turbulence, prevents cavitation of the flow and notably reduces the noise of the valve as has been experimented in tests carried out during bad water flow and pressure conditions.

What is claimed:

1. An antinoise baffle especially for screw type valves having a hollow cylinder body designed to be screwed into a tap unit in line to a water delivery conduit, where said cylinder body, starting from the bottom, has an annular gasket (17), a first ceramic disk (13) fixed in the body with at least one hole (13a) for the flow of water, a second ceramic disk (14) resting against and rotating on the first with at least one lateral slot (14a) positionable in correspondence to and away from the one of the first disk following a quarter or half rotation of the second disk, an entrainer (18) fitted in the body of the valve so as to rotate and is splined to the second disk (14) in order to turn it, and a central rod (19) splined to the entrainer (18) and having a manual knob so as to move the second disk through the entrainer, where the cylinder body and/or the entrainer also have radial openings (20) for the outlet of water towards a mouth, said baffle has at least one net (21) placed and blocked on the second disk (14) and having at least one wind which extends towards the first disk near to one or each lateral slot (14a) of said second disk, the wings extending between said slot and the opening (20) for the outlet of water.

2. An antinoise baffle as claimed in claim 1, characterized in that said net (21) has a transversal horizontal part placed and held between said second disk (14) and said entrainer (18).

3. An antinoise baffle as claimed in claims 1 or 2, characterized in that one or each wing (23) of said net (21) extend downwards from said transversal horizontal parts, (22) towards the first fixed disk (13).

4. An antinoise baffle as claimed in claim 3, characterized in the one or each wing (23) of said net (21) ends with a flap (23a) turned upwards towards the outside.

* * * * *